United States Patent
Zeppenfeld

(10) Patent No.: US 7,607,633 B2
(45) Date of Patent: Oct. 27, 2009

(54) COOLED MOLD SYSTEM FOR MAKING A PREFORM

(75) Inventor: Reinhard Zeppenfeld, Kierspe (DE)

(73) Assignee: GWK Gesellschaft Warme Kaltetechnik mbH, Kierspe (DE)

( * ) Notice: Subject to any disclaimer, the term of this patent is extended or adjusted under 35 U.S.C. 154(b) by 547 days.

(21) Appl. No.: 11/432,759

(22) Filed: May 11, 2006

(65) Prior Publication Data
US 2006/0263465 A1    Nov. 23, 2006

(30) Foreign Application Priority Data
May 20, 2005   (DE)   ................ 20 2005 008 170 U

(51) Int. Cl.
*B29C 45/73*   (2006.01)
*B29C 33/02*   (2006.01)

(52) U.S. Cl. .................... 249/80; 425/533; 425/547

(58) Field of Classification Search ............... 425/533, 425/547; 249/79, 80; 264/328.14
See application file for complete search history.

(56) References Cited

U.S. PATENT DOCUMENTS

| | | | | |
|---|---|---|---|---|
| 1,776,355 A | * | 9/1930 | Eppensteiner | ............. 249/79 |
| 4,412,806 A | * | 11/1983 | Gaiser et al. | ............. 425/554 |
| 4,655,280 A | * | 4/1987 | Takahashi | ............. 165/47 |
| 5,498,150 A | * | 3/1996 | Check | ............. 425/526 |
| 6,077,067 A | * | 6/2000 | Gellert | ............. 425/552 |
| 6,079,972 A | * | 6/2000 | Gellert | ............. 425/552 |
| 6,168,740 B1 | * | 1/2001 | Koch et al. | ............. 264/237 |
| 6,203,310 B1 | * | 3/2001 | Matysek | ............. 425/547 |
| 6,276,922 B1 | * | 8/2001 | Huston et al. | ............. 425/526 |
| 6,413,075 B1 | * | 7/2002 | Koch et al. | ............. 425/526 |
| 6,569,370 B1 | * | 5/2003 | Amin et al. | ............. 264/219 |
| 2002/0187217 A1 | * | 12/2002 | McDonald et al. | ............. 425/547 |
| 2006/0121150 A1 | * | 6/2006 | Plass et al. | ............. 425/533 |

FOREIGN PATENT DOCUMENTS

DE   3828383   3/1990

* cited by examiner

*Primary Examiner*—Yogendra Gupta
*Assistant Examiner*—Emmanuel S Luk
(74) *Attorney, Agent, or Firm*—Andrew Wilford

(57) ABSTRACT

A mold system has a hollow outer mold part extending along a mold axis, a hollow inner mold part inside the outer mold part and forming therewith an elongated cup-shaped cavity adapted to hold a plastic mass for the production of a preform, and a cooling tube extending coaxially inside the hollow inner part and forming a passage having an inner portion inside the tube and an annular-section outer portion outside the tube and between an outer surface of the tube and an inner surface of the inner mold part. A cooler circulates a coolant fluid through the passage. A plurality of angularly spaced and generally axially extending support ribs extend radially from one of the surfaces toward the other surface in the outer passage portion.

9 Claims, 2 Drawing Sheets

COOLED MOLD SYSTEM FOR MAKING A PREFORM

FIELD OF THE INVENTION

The present intention relates to a cooled mold system. More particularly this invention concerns such a mold system used to make a preform, e.g. for a drink bottle.

BACKGROUND OF THE INVENTION

The invention relates to a mold system having a hollow outer mold part extending along a mold axis and a hollow inner mold part inside the outer mold part and forming therewith an annular cavity adapted to hold a plastic mass for the production of a preform, e.g. of a drink bottle. To speed curing of the plastic mass a cooling tube extends coaxially inside the hollow inner part and forms a passage having an inner portion inside the tube and an outer portion outside the tube and between an outer surface of the tube and an inner surface of the inner mold part. A coolant, e.g. cold water, is circulated through the passage.

Such molds are used for the primary forming of preforms that subsequently are blown up to a form a bottle and are then reformed. For fast cooling of the preform after its forming in the cavity between the inner and outer mold part a coolant, for example water, is pumped into the inner mold part by means of the cooling tube. The coolant passes through the circular outer passage portion to contact the inner surface of the inner mold part. In this manner, a relatively fast cooling of the preform is achieved so that the fabrication speed of the preform is relatively high. The fabrication time is substantially a function of the cooling of the preform.

OBJECTS OF THE INVENTION

It is therefore an object of the present invention to provide an improved cooled mold system for making a preform or the like.

Another object is the provision of such an improved cooled mold system for making a preform or the like that overcomes the above-given disadvantages, in particular that has a higher cooling speed of the preform.

SUMMARY OF THE INVENTION

A mold system has according to the invention a hollow outer mold part extending along a mold axis, a hollow inner mold part inside the outer mold part and forming therewith an elongated cup-shaped cavity adapted to hold a plastic mass for the production of a preform, and a cooling tube extending coaxially inside the hollow inner part and forming a passage having an inner portion inside the tube and an annular-section outer portion outside the tube and between an outer surface of the tube and an inner surface of the inner mold part. A cooler circulates a coolant fluid through the passage. A plurality of angularly spaced and generally axially extending support ribs extend radially from one of the surfaces toward the other surface in the outer passage portion.

Such longitudinal ribs include cooling ribs for a respectively fast heat transfer from the inner mold part, so that the preform is cooled faster. The longitudinal ribs can also be support ribs that are braced between the inner mold part and the cooling tube.

In particular the invention provides that between the outer surface of the cooling tube and the inner surface of the inner mold part, angularly equispaced longitudinal ribs form a supporting connection between both parts.

Due to this arrangement, on the one hand, an additional heat transfer from the inner mold part and thus, from the preform is achieved, wherein moreover a supporting of the inner mold part by means of the support ribs and the cooling tube is achieved, so that during the injection operation of the preform, deformation of the inner mold part is avoided.

Preferably, there are four such longitudinal ribs are designed as support ribs between cooling tube and inner mold part.

In particular, it is advantageously provided herein that the wall of the inner mold piece is designed thin-walled, preferably having a minimum wall thickness of about 1.5 mm.

Due to this arrangement of the relatively stable inner tube and the longitudinal ribs functioning as support ribs between the cooling tube and the inner mold part, it is possible to minimize the wall thickness of the inner mold part, so that for example a minimum wall thickness of 1.5 mm can be used. This small wall thickness results in turn in fast heat transfer in the cooling process through the through-flowing cooling medium. Despite the thin-walled design of the inner work part an undesired deformation of the inner mold part is avoided, since the thin-walled inner mold part is supported by the longitudinal support ribs on the more rigid cooling tube.

A preferred advanced design, which also itself is particularly advantageous, is that on the inner surface of the inner mold part there are angularly equispaced longitudinal cooling ribs whose inner edges are spaced outward of the outer surface of the cooling tube. Due to this design, a plurality of additional heat transfer elements are effective on the inner mold part, by means of which a fast heat transfer can be achieved by means of the cooling medium from the inner mold part and thus from the preform.

A particularly preferred design is that between every two longitudinal support ribs there are several radially shorter cooling ribs that project inward from the inner mold part and end have a radial spacing from the cooling tube. Thus, solid support and excellent cooling can be achieved.

A design which is preferable in certain cases is that the longitudinal ribs are oriented parallel to the center axis of the cooling tube and of the inner mold part. Such design can be fabricated relatively easily and is therefore advantageous.

An alternative thereto is that the longitudinal ribs have a helicoidal shape so as to a helical channel over the length of the cooling tube and the inner mold part that only has a total angular length of 360°. Such design indeed is slightly more complicated in terms of fabrication, but in certain cases achieve better cooling and/or support.

For promoting the desired heat transfer, it is moreover provided that all the ribs consist of material that has good heat-conducting properties, in particular are formed onto the inner mold part, which typically is made of metal. Moreover, it can be provided that the cooling tube consists of a material having poor heat-conducting properties. This way undesired heat exchange between the incoming and outgoing cooling medium is reduced.

A concrete and preferred design of the invention is that the inner mold part has is a long tubular cylinder on one end of which is a hemispherical cap. The cooling tube in the transition area between the inner and outer portions of the coolant passage is spaced from the cap. The longitudinal ribs of the outer mold part, at least the longitudinal ribs which do not have the function of support ribs, follow a radial course right up to the center of the cap.

BRIEF DESCRIPTION OF THE DRAWING

The above and other objects, features, and advantages will become more readily apparent from the following description, it being understood that any feature described with reference to one embodiment of the invention can be used where possible with any other embodiment and that reference numerals or letters not specifically mentioned with reference to one figure but identical to those of another refer to structure that is functionally if not structurally identical. In the accompanying drawing.

SPECIFIC DESCRIPTION

Figure 1:
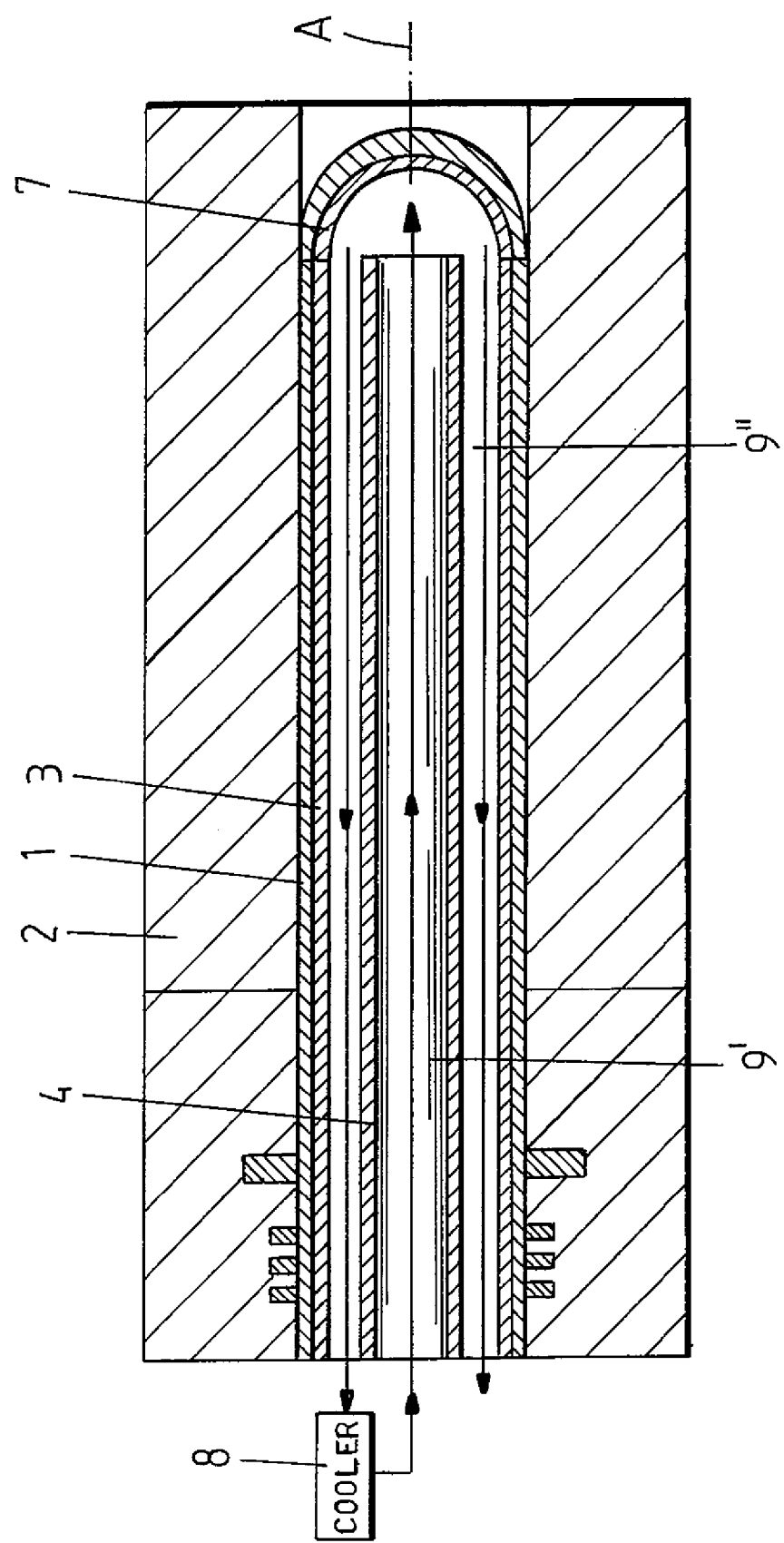
FIG. 1 is a partly schematic axial section through the system of this invention.
Figure 2:
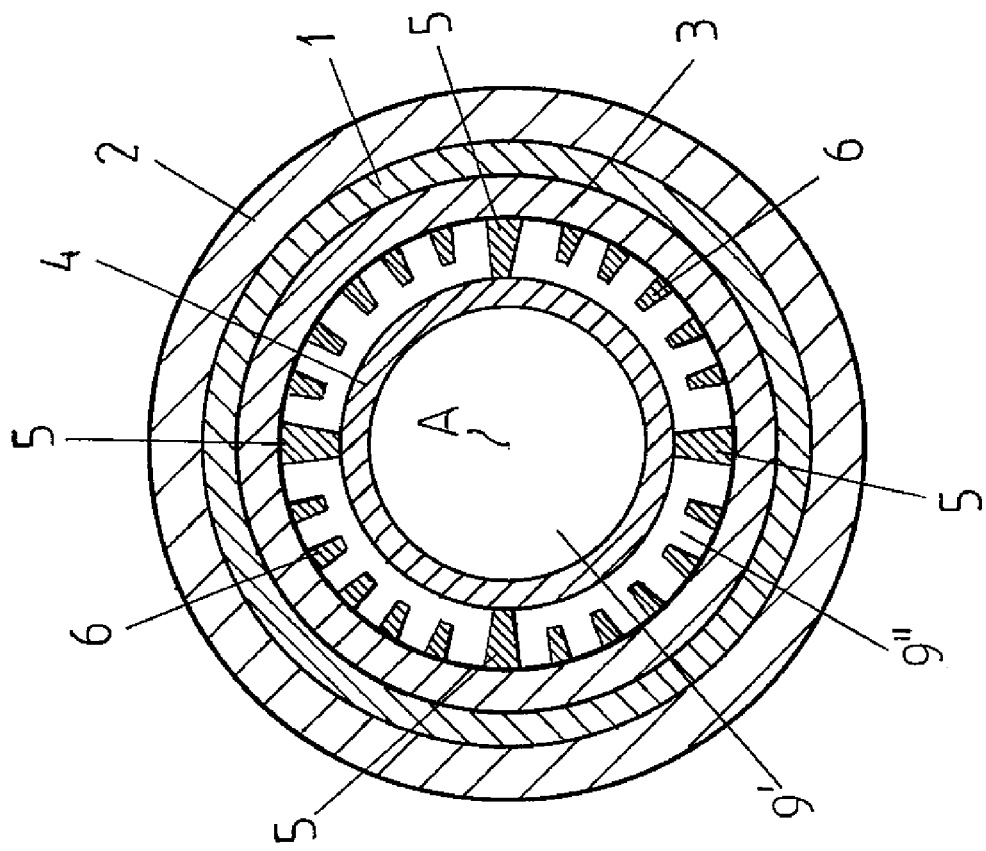
FIG. 2 is a cross section through the system.

As seen in FIGS. 1 and 2 a mold for the primary forming of a hollow, cartridge-shaped preform 1 is shown in a strictly simplified manner. The preform 1 is a piece from which in a subsequent blow operation a common drinking bottle is formed. The preform 1 is in principle formed ad a deep cup or cartridge with a cylindrical hollow side wall and a hemispherical end. Near a mouthpiece on the preform 1, a support ring and a screwthread are formed.

The mold consists of an outer mold part 2 (if necessary multi-part) and an inner mold part 3. The mold parts 2 and 3 form a cavity shaped complementary to the preform 1. The inner mold part 3 that itself is formed as a deep cup receives with space a cooling tube 4 that is centered on an axis A and that ends at a spacing from the inner end (to the right in FIG. 1) of the inner mold part 3. A cooler 8 pumps a coolant, e.g cold water, axially into the cooling tube 4 so that it moves as shown by the arrows axially inward (left to right in FIG. 1) to the inner end of the tube 4 along an inner mold-passage portion 9', then flows axially outward (right to left in FIG. 1) along an outer mold-passage portion 9" to reenter the cooler 8. The flow direction can also be the reverse. This cooling medium quickly cools the inner mold part 3 and thus in particular the preform 1 in it.

For improving the cooling effect, as shown in FIG. 2, there is between the outer surface of the cooling tube 4 and the inner surface of the inner mold part 3, an array of longitudinal ribs 5 and 6 is provided that serve two multiple purposes as will be further described hereinafter.

Between the outer surface of the cooling tube 4 and the inner surface of the inner mold part 3, the angularly spaced ribs 5 form a support connection between the two parts 2 and 3. In the illustrated embodiment, four such longitudinal ribs 5 are designed as support ribs between the cooling tube 4 and the inner mold part 3. These support ribs 5 in particular have the function of absorbing radial forces brought to bear during the injection operation upon the inner mold part 3. Due to the arrangement of these support ribs 5 along with the cooling tube 4, it is possible to minimize the wall thickness of the inner mold part 3 so that for example a wall thickness of 1.5 mm is possible without the mold deforming during the injection operation. Such a thin inner mold part 3 allows excellent heat transfer between the preform 1 and the liquid in the outer passage portion 9".

In the embodiment, the longitudinal ribs 6 on the inner surface of the inner mold part 3 end at a radial spacing outward from the cooling tube 4. Here there are five cooling ribs 6 between every two adjacent support ribs 5. These as well lead to an increase in the cooling effect outside the mold part 3. In the embodiment of FIGS. 1 and 2, all the longitudinal ribs 5 or 6, respectively, extend parallel to the center axis A of the cooling tube 4 and of the inner mold part 3.

Figure 3:
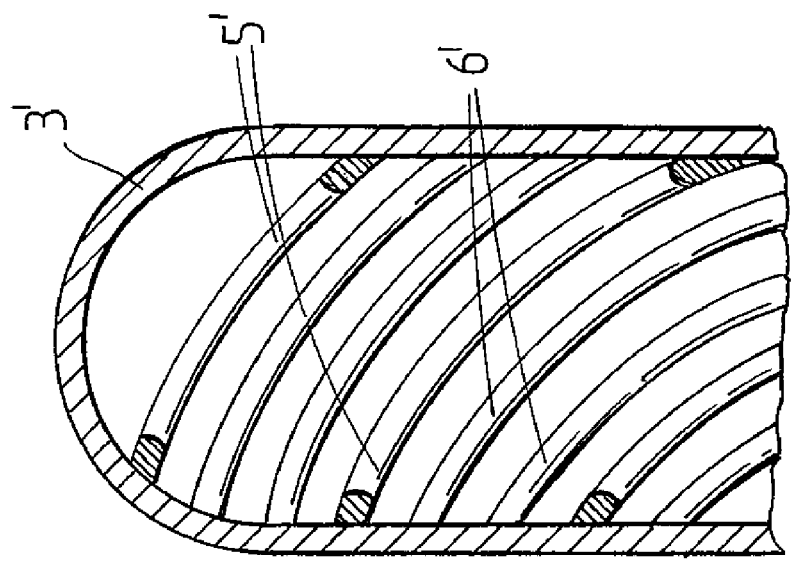
FIG. 3 is a small-scale axial section through an alternate inner mold part in accordance with the invention.

It is also possible as shown in FIG. 3, for an inner mold part 3' to have helically extending support ribs 5' and cooling ribs 6'.

All ribs 5 and 6 consist of a material having good heat-conducting properties and are preferably formed unitarily on the inner mold part 3. The cooling tube 4 consists of a material having poor heat-conducting properties. The cooling tube 4 preferably consists of a material having high strength for maximizing support. The cooling tube 4 can also be designed thick-walled for minimizing heat exchange and maximizing strength. As can be seen in particular in FIG. 1, the inner mold part 3 has a long cylindrical side wall to which is attached a hemispherical cap 7 as a closed inner end. The cooling tube 4 ends in the area of the transition from the cylindrical side wall of the cap 7. The ribs 5 and 6 can preferably follow a radial course until reaching the center of the cap 7, so as also to provide heat exchange and axial support to the inner end of the part 3.

The invention provides a constructive solution by means of easy measures to achieve considerably higher cooling speeds of the preform 1, the improved and faster cooling being achieved by the ribs 5 and 6 and by the reduction of the wall thickness of the inner mold part 3. In addition to the advantage of faster cooling, a further advantage is the more efficient heat transfer due to reduced wall thickness of the mold part 3 and the increased. Thus the cooling medium flow rate can be reduced with nevertheless the same cooling rate or even faster cooling, so that the expense for the installation and its specific energy consumption can be reduced.

The invention is not limited to the example of embodiment but is variable in multiple ways in the scope of the disclosure. All individual and combination features which are novel and disclosed in the description and/or the drawing are considered as substantial of the invention.

I claim:

1. A mold system comprising:
    a hollow outer mold part extending along a mold axis;
    a hollow and thin-walled inner mold part inside the outer mold part, substantially less rigid than the outer mold part, and forming therewith an elongated cup-shaped cavity adapted to hold a plastic mass for the production of a preform;
    a cooling tube extending coaxially inside the hollow inner part and forming a passage having an inner portion inside the tube and an annular-section outer portion outside the tube and between an outer surface of the tube and an inner surface of the inner mold part;
    means for circulating a coolant fluid through the passage;
    four angularly substantially equispaced and generally axially extending support ribs extending radially from one of the surfaces and bearing radially on the other surface in the outer passage portion; and
    a plurality of generally axially extending cooling ribs projecting inward from the inner-part inner surface, between each of the support ribs and an adjacent one of the support ribs, and each having an inner edge spaced from the tube outer surface.

2. The mold system defined in claim 1 wherein both of the mold parts have a closed end and an open end, the cooling tube having an inner end spaced from the closed inner-part end.

3. The mold system defined in claim 1 wherein the support ribs bear radially on the other of the surfaces, whereby the support ribs brace the inner part relative to the tube.

4. The mold system defined in claim 1 wherein the inner mold part has a wall thickness of about 1.5 mm.

5. The mold system defined in claim 1 wherein the inner mold part is thermally highly conductive and the tube is thermally insulating.

6. The mold system defined in claim 1 wherein the support ribs bear radially on the other of the surfaces, whereby the support ribs brace the inner part relative to the tube.

7. The mold system defined in claim 6 wherein the ribs all extend generally parallel to the axis.

8. The mold system defined in claim 6 wherein the ribs extend generally helically.

9. The mold system defined in claim 8 wherein the ribs each extend angularly only through about 360° between inner and outer ends.

* * * * *